(12) United States Patent
Devereaux et al.

(10) Patent No.: US 11,532,005 B1
(45) Date of Patent: Dec. 20, 2022

(54) SYSTEM AND METHOD TO PROVIDE SAVINGS BASED ON REDUCED ENERGY CONSUMPTION

(71) Applicant: United Services Automobile Association (USAA), San Antonio, TX (US)

(72) Inventors: Ramsey Devereaux, San Antonio, TX (US); David C. Ault, San Antonio, TX (US); Christina N. Nickel, Boerne, TX (US); Elizabeth J. Rubin, San Antonio, TX (US); Daniela Wheeler, Boerne, TX (US); Justin D. Haslam, San Antonio, TX (US); Thuy Hugos, San Antonio, TX (US); Spencer Read, Helotes, TX (US); Ann C. Tarrillion, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 5 days.

(21) Appl. No.: 17/099,355

(22) Filed: Nov. 16, 2020

Related U.S. Application Data

(63) Continuation of application No. 16/235,911, filed on Dec. 28, 2018, now Pat. No. 10,839,410, which is a continuation of application No. 14/573,981, filed on Dec. 17, 2014, now Pat. No. 10,169,771.

(60) Provisional application No. 61/948,192, filed on Mar. 5, 2014, provisional application No. 61/943,901, filed on Feb. 24, 2014, provisional application No. 61/943,906, filed on Feb. 24, 2014, provisional application No. 61/943,897, filed on Feb. 24, 2014, provisional application No. 61/926,534, filed on Jan. 13, 2014, provisional application No. 61/926,541, filed on Jan. 13, 2014, provisional application No. 61/926,536, filed on Jan. 13, 2014, provisional application No. 61/926,532, filed on Jan. 13, 2014,
(Continued)

(51) Int. Cl.
*G06Q 30/02* (2012.01)
*G06Q 40/08* (2012.01)

(52) U.S. Cl.
CPC ......... *G06Q 30/0215* (2013.01); *G06Q 40/08* (2013.01)

(58) Field of Classification Search
CPC .......................... G06Q 40/08; G06Q 30/0215
See application file for complete search history.

(56) References Cited

U.S. PATENT DOCUMENTS 8,289,160 B1 * 10/2012 Billman ................. G08B 21/18
340/540
8,400,299 B1 * 3/2013 Maroney ................. G06Q 10/10
340/540

* cited by examiner

*Primary Examiner* — Edward Chang
(74) *Attorney, Agent, or Firm* — Fletcher Yoder, PC

(57) ABSTRACT

A computer device and method for processing informatic data from one or more sensor devices associated with a property are provided herein. A first set of informatics data of a first property at a first period of time are analyzed to identify a first operating characteristic associated operating the first property. Operational changes to be implemented at a second property are identified based upon an operational efficiency of the first operating characteristic over a second operating characteristic of the second property. Second sensor data of the second property is used to determine that at least one of the identified operational changes has been implemented. Provision of a discount, a rebate, a monetary transfer, or any combination thereof is provided based upon the implementation.

20 Claims, 4 Drawing Sheets

Related U.S. Application Data provisional application No. 61/926,121, filed on Jan. 10, 2014, provisional application No. 61/926,111, filed on Jan. 10, 2014, provisional application No. 61/926,114, filed on Jan. 10, 2014, provisional application No. 61/926,103, filed on Jan. 10, 2014, provisional application No. 61/926,095, filed on Jan. 10, 2014, provisional application No. 61/926,093, filed on Jan. 10, 2014, provisional application No. 61/926,108, filed on Jan. 10, 2014, provisional application No. 61/926,098, filed on Jan. 10, 2014, provisional application No. 61/926,118, filed on Jan. 10, 2014, provisional application No. 61/926,091, filed on Jan. 10, 2014, provisional application No. 61/926,119, filed on Jan. 10, 2014, provisional application No. 61/926,123, filed on Jan. 10, 2014.

SYSTEM AND METHOD TO PROVIDE SAVINGS BASED ON REDUCED ENERGY CONSUMPTION

CROSS REFERENCE TO RELATED APPLICATIONS

This application is a continuation of and claims priority to U.S. patent application Ser. No. 16/235,911, filed on Dec. 28, 2018, which is a continuation of and claims priority to U.S. patent application Ser. No. 14/573,981, filed on Dec. 17, 2014, which claims priority to: U.S. Patent Application Ser. Nos.: 61/926,093 filed Jan. 10, 2014; 61/926,091 filed Jan. 10, 2014; 61/926,095 filed Jan. 10, 2014; 61/926,098 filed Jan. 10, 2014; 61/926,103 filed Jan. 10, 2014; 61/926,108 filed Jan. 10, 2014; 61/926,111 filed Jan. 10, 2014; 61/926,114 filed Jan. 10, 2014; 61/926,118 filed Jan. 10, 2014; 61/926,119 filed Jan. 10, 2014; 61/926,121 filed Jan. 10, 2014; 61/926,123 filed Jan. 10, 2014; 61/926,536 filed Jan. 13, 2014; 61/926,541 filed Jan. 13, 2014; 61/926,534 filed Jan. 13, 2014; 61/926,532 filed Jan. 13, 2014; 61/943,897 filed Feb. 24, 2014; 61/943,901 filed Feb. 24, 2014; 61/943,906 filed Feb. 24, 2014; and 61/948,192 filed Mar. 5, 2014 which are each incorporated herein by reference in its entirety.

FIELD OF THE INVENTION

The disclosed embodiments generally relate to a method and computerized system for managing insurance and related products and services, and more particularly, to identifying savings opportunities for an insured property using informatic data.

BACKGROUND OF THE INVENTION

Smart home functionality is a maturing space, but the opportunity for insurance companies remains largely untapped. Currently, there are few useful early warning and loss mitigation systems that actually save costs and time for both the property owner and insurance company alike. For instance, currently, homeowners insurance claim events are detected by the homeowner, who then contacts his or her insurance company to inform them that there has been a loss. However, the loss could be mitigated with automated warning and detection systems that interface with the insurance company systems. For example, homeowners may not become aware of minor to medium hail damage to their roofs until such time as that damage leads to water damage to the exterior or interior of the home. If they could be made aware of such loss events earlier and then take corrective actions, then the increased damage and loss could have been mitigated or avoided.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, provided is a computer device and method for processing informatic data from one or more sensor devices associated with a property covered by an insurance policy. Analysis is performed on the informatic data received from the sensor devices to determine a cost associated with operating the insured property. Operational changes are identified and recommended regarding one or more operational aspects of the insured property to achieve a cost savings for operating the insured property. If one or more recommended operational changes are implemented, a realized cost savings is calculated which is attributable to the one or more operational changes. Monetary funds are transferred from a first financial account to a second financial account associated with a user of the insured property whereby the transfer funds amount is dependent upon the calculated realized cost savings.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
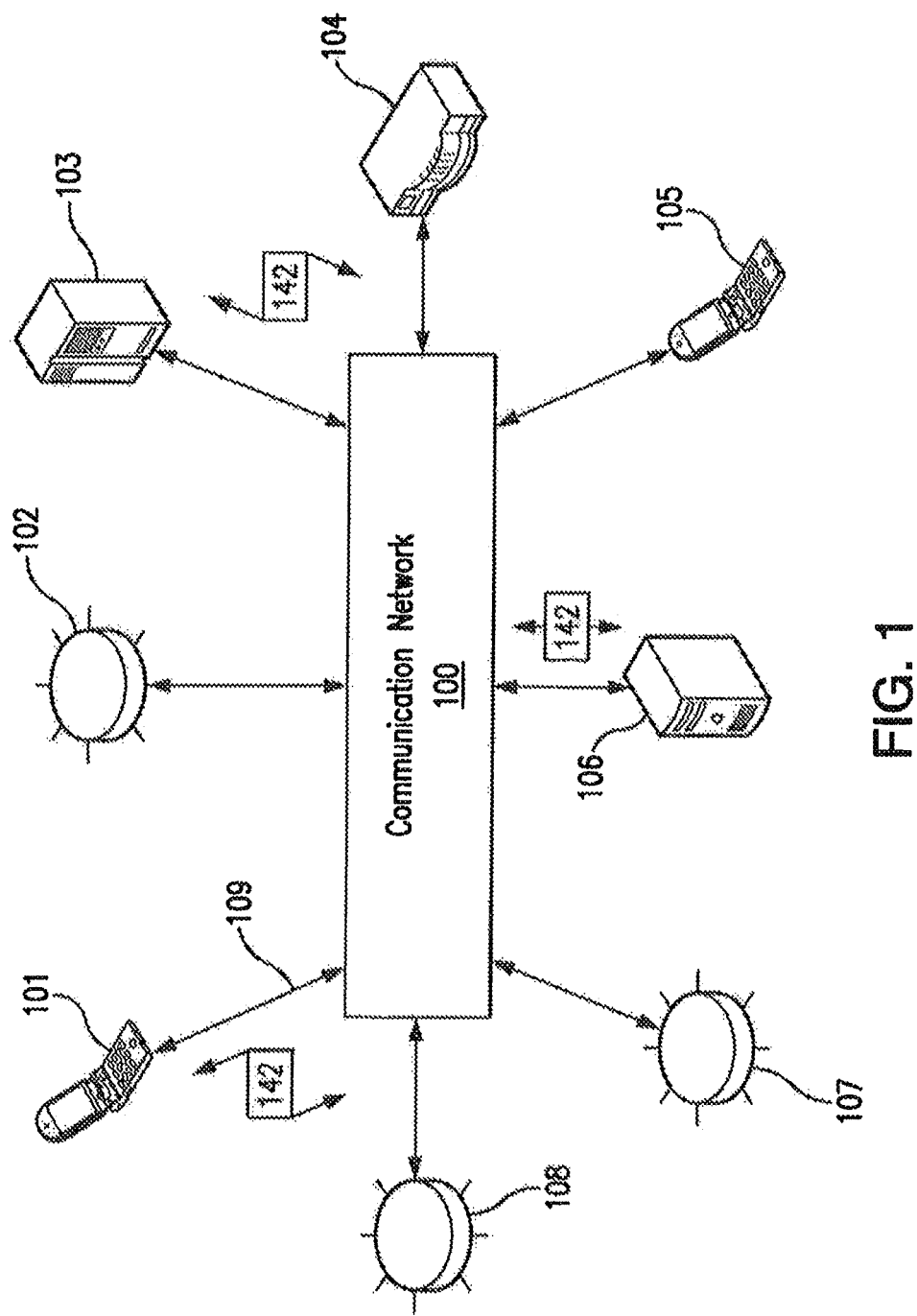
FIG. 1 illustrates an example communication network in accordance with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety. For instance, commonly assigned U.S. Pat. Nos. 8,289,160 and 8,400,299 are related to certain embodiments described here and are each incorporated herein by reference in their entirety.

As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, the term "maintenance related data" refers to data or information that may indicate or suggest that repairs or maintenance may be needed now or in the future to a building, insured property, or other structure, or the premises or grounds where a building, insured property, or other structure is located.

As used herein, "insured property" means a dwelling, other buildings or structures, personal property, or business property that may be covered by an insurance policy.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as an insured property 300 or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
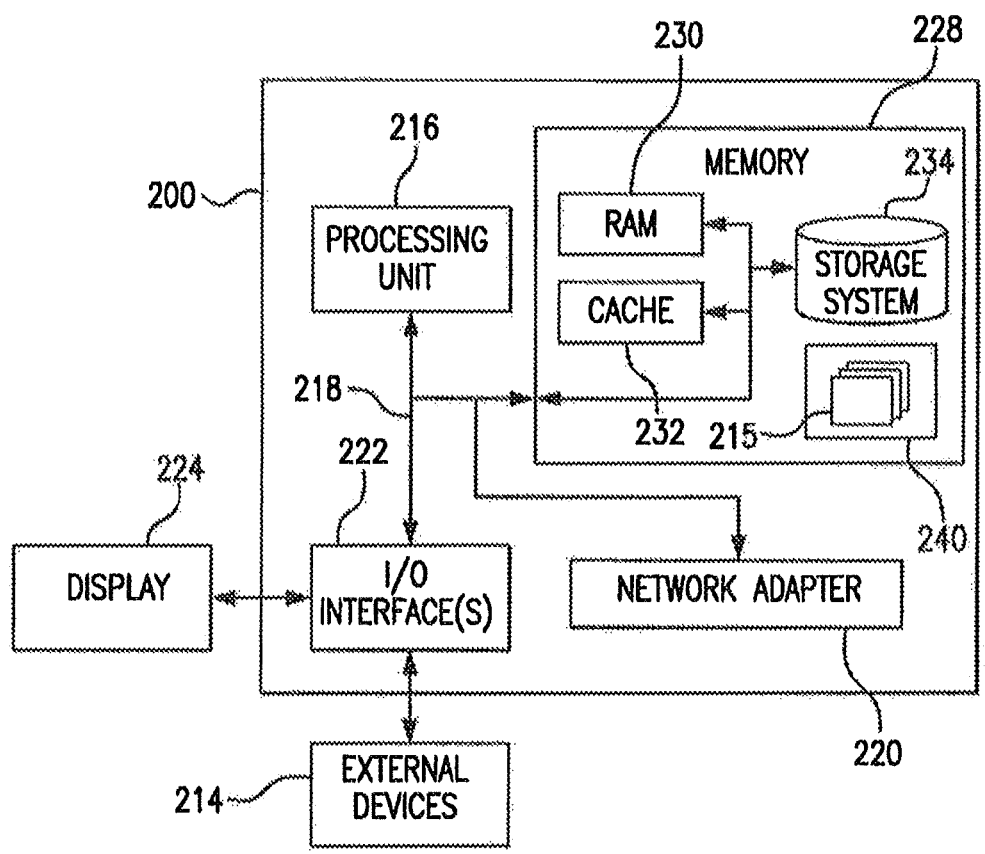
FIG. 2 illustrates a network computer device/node in accordance with an illustrated embodiment.

FIG. 2 is a schematic block diagram of an example network computing device 200 (e.g., one of network devices 101-108) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as insured property analyzer module 306 and maintenance manager module 308 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
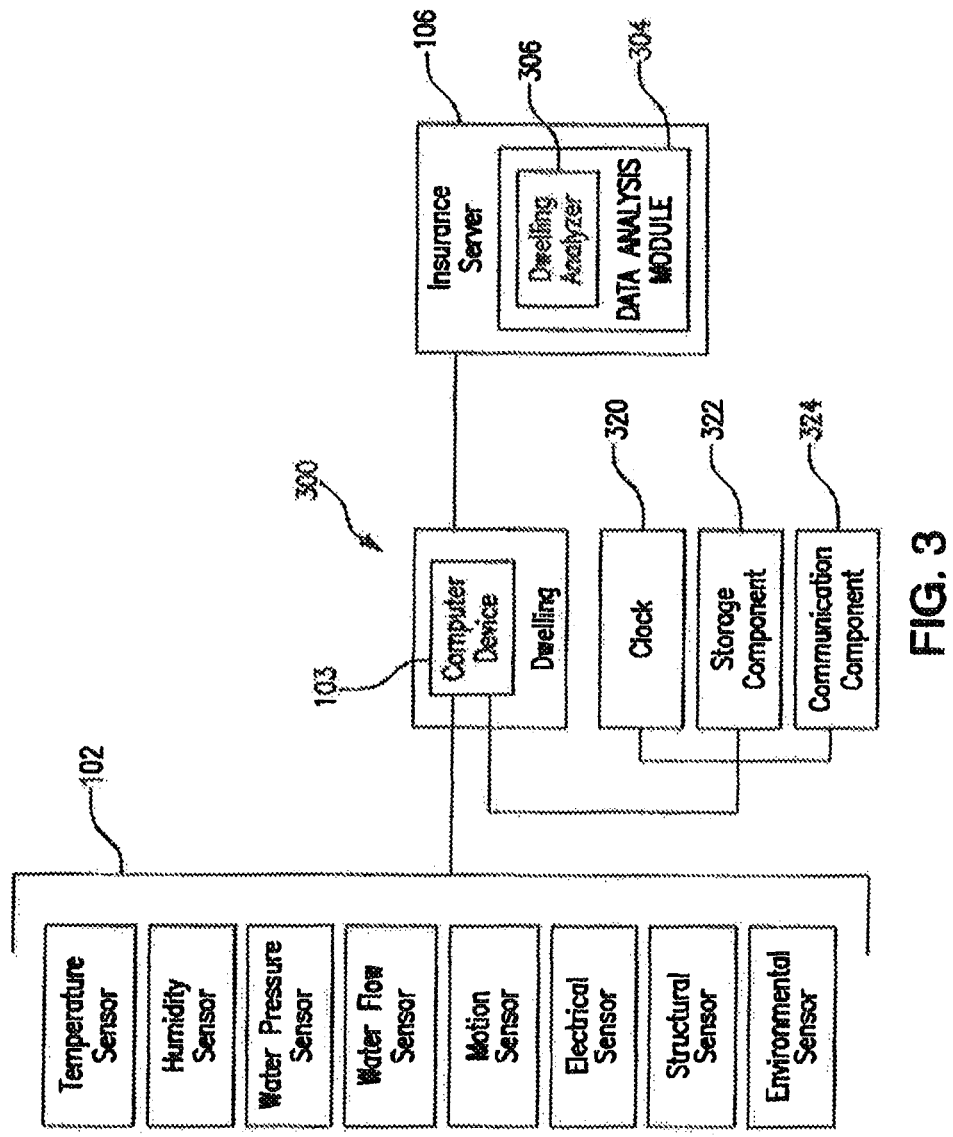
FIG. 3 is a block diagram of an insured property from which sensor data is captured for subsequent analysis in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3, an example of an insured property 300 is shown which is to be understood to be any type of insured property structure (e.g., residential, commercial, retail, municipal, etc.) in which the capture and analysis of sensor data (102) is useful for the reasons at least described below. Insured property 300 preferably includes a computing device 103 for capturing data from a plurality of sensors 102 which capture data regarding various aspects of insured property 300, as further described below. It is to be understood insured property computing device 103 may be located in any location, and its position is not limited to the example shown.

Computing device 103 is preferably configured and operational to receive (capture) data from various sensors 102 regarding certain aspects (including functional and operational) of insured property 300 (described further below) and transmit that captured data to a remote server 106, via network 100. It is noted device 103 may perform analytics regarding the captured sensor data regarding insured property 300 and/or the remote server 106, preferably controlled by an insurance company/carrier, may perform such analytics, as also further described below. It is also to be understood in other embodiments, data from sensors 102 may be transmitted directly to remote server 106, via network 100, thus either obviating the need for insured property computing device 103 or mitigating its functionality to capture all data from sensors 102.

In the illustrated embodiment of FIG. 3, insured property computing device 103 is shown coupled to various below described sensor types 102. Although various sensor types 102 are described below and shown in FIG. 3, the sensor types described and shown herein are not intended to be exhaustive as embodiments of the present invention may encompass any type of known or unknown sensor type which facilitates the purposes and objectives of the certain illustrated embodiments described herein. Exemplary sensor types include (but are not limited to):

Temperature sensor—configured and operational to preferably detect the temperature present at the insured property 300. For example, the temperature may rise and fall with the change of seasons and/or the time of day. Moreover, in the event of a fire, the temperature present at the insured property 300 may rise quickly—possibly to a level of extreme high heat. The temperature sensor may make use of probes placed at various locations in and around the insured property 300, in order to collect a representative profile of the temperature present at the insured property 300. These probes may be connected to device 103 by wire, or by a wireless technology. For example, if device 103 is positioned in the attic of the insured property 300, the temperature may be higher than the general temperature present in the insured property. Thus, probes placed at various locations (e.g., in the basement, on the various levels of a multi-level insured property 300, in different rooms that receive different amounts of sun, etc.), in order to obtain an accurate picture of the temperature present at the insured property. Moreover, device 103 may record both the indoor and outdoor temperature present at the insured property 300. For example, data about the indoor temperature, the outdoor temperature, and/or the differential between indoor and outdoor temperatures, may be used as part of some analysis model, and thus all of the different values could be stored. Device 103 may store an abstract representation of temperature (e.g., the average indoor temperature, as collected at all of the probes), or may store each temperature reading individually so that the individual readings may be provided as input to an analysis model.

Humidity sensor—configured and operational to preferably detect the humidity present at the insured property 300. Humidity sensor may comprise the humidity-detection hardware, or may employ one or more remote probes, which may be located inside and/or outside the insured property 300.

Humidity readings from one or more locations inside and/or outside the insured property could thus be recorded by device 103.

Water Sensor(s)/Water pressure sensor(s)—configured and operational to preferably monitor water related conditions, including (but not limited to): the detection of water and water pressure detection, for instance in the plumbing system (including water lines, sewer lines, HVAC system, appliances, automatic fire suppression systems, sprinkler systems, and sump pumps) in the insured property 300. With regards to a water pressure sensor, it may have one or more probes attached to various locations of the insured property's 300 plumbing, and thus device 103 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. Thus, device 103 may record the water pressure (and water flow) that is present in the plumbing system at various points in time.

Water Detection sensor—configured and operational to preferably monitor water leaks or moisture in or from the plumbing system in the insured property 300. Water detection sensor may have one or more probes/sensors attached to various locations of the insured property's 300 plumbing, and thus device 103 may record a potential water leak or area of moisture buildup in the structure.

Wind speed sensor—configured and operational to record the wind speed present at the insured property 300. For example, one or more wind sensors may be placed outside the insured property 300, at the wind speed and/or direction may be recorded at various points in time. Device 103 may record these wind speed and/or wind direction readings. The wind speed may be used by an analysis model for various purposes.

Motion sensor—configured and operational to sense motion in the insured property 300 to which device 300 is attached. Typically, insured property's 300 do not move significantly, except in the event of a catastrophe. Motion sensor may indicate that the insured property 300 is sliding down a hill (e.g., in the event of an extreme flood or mudslide), or is experiencing a measurable earthquake. A motion sensor may further include earth sensors for detecting sink holes and earth movement. In addition, a motion sensor may be configured and operational to sense the motion of objects within the building, insured property, or other structure.

Electrical system sensor/analyzer—configured and operational to assess the condition of the electrical system. For example, potentiometers may be connected to various points in the insured property's 300 electrical system to measure voltage. Readings from the potentiometers could be used to determine if the voltage is persistently too high, or too low, or if the voltage frequently drops and/or spikes. Such conditions may suggest that the insured property 300 is at risk for fire. Other types of electrical measurements could be taken, such as readings of current flowing through the electrical system. Still other types of electrical measurements could be determined include how energy is used and at what times of day it is used, etc. Any type of data about the insured property's 300 electrical system could be captured by device 103. An analysis model could use the information about electrical energy in various ways.

Positional sensor configured and operational to record the position of device 103. For example, the positional sensor may be, or may comprise, a Global Positioning System (GPS) receiver, which may allow the position of device 103 to be determined. Or, as another example, positional sensor may use triangulation technology that communicates with fixed points (such as wireless communication towers) to determine its position. While a insured property 300 normally does not move, positional sensor may allow device 103 to be recovered in the event of a catastrophe. For example, if an insured property 300 explodes, or is otherwise catastrophically damaged, device 103 may be propelled to an unknown location. Positional sensor may indicate the geographical area of an insured property 300 which an analysis model could use in various ways. Positional sensor may record the position of device 103, which device 103 could communicate to an external source, thereby allowing device 103 to be found.

Structural sensor—configured and operational to preferably detect various structural conditions relating to insured property 300. A structural sensor may comprise detection hardware, or may employ one or more remote probes, which may be located inside and/or outside the insured property 300. Conditions recorded by structural sensor may include (but are not limited to) the condition of the wall structure, floor structure, ceiling structure and roof structure of insured property 300, which may be achieved via: load bearing detectors; components which measure the slope of a floor/wall/ceiling; carpet conditions (e.g., via nano sensor) or any other components functional to detect such conditions. Structural readings from one or more locations inside and/or outside the insured property 300 could thus be recorded by device 103 and used by an analysis model in various ways.

Environmental Sensor—configured and operational to preferably detect various environmental conditions relating to insured property 300. An environmental sensor may comprise detection hardware, or may employ one or more remote probes, which may be located inside and/or outside the insured property 300. Conditions recorded by an environmental sensor may include (but are not limited to) the air quality present in insured property 300, the presence of mold/bacteria/algae/lead paint or any contaminant adverse to human health (whether airborne or attached to a portion of the structure of insured property 300). Such environmental readings from one or more locations inside and/or outside the insured property 300 could thus be recorded by device 103 and used by an analysis model in various ways.

Appliance Sensor—configured and operational to preferably detect various operating parameters relating to appliances within an insured property 300. Examples of appliances include (but are not limited to) all kitchen appliances (e.g., refrigerator, freezer, stove, cooktop, oven, grill, dishwasher, etc.); HVAC components (air conditioner, heating system, air handlers, humidifiers/de-humidifiers, etc.), water purification system, media entertainment system (e.g., televisions), networking components (routers, switches, extenders, etc.) electrical generator system, pool filtration and heating system, garage door openers, sump pump and water well system, septic tank system, garage door opener, etc. An appliance sensor may comprise detection hardware, or may employ one or more remote probes, which may be located inside and/or outside the insured property 300 functional to detect certain operating parameters of appliances. Operating parameters detected by an appliance sensor 300 may include (but are not limited to): the operating efficiency of an appliance (energy usage, output performance); the time an appliance operates, the age of an appliance; maintenance needs of an appliance (e.g., change a filter component or schedule a periodic examination/tune-up); and repair needs of an appliance (which may also include the identification of parts needed). Such appliance readings from one or more insured property appliances could thus be recorded by device 203 and used by an analysis model in various ways. Image Sensor—configured and operational to obtain image information regarding the subject property within insured property 300. Examples of image sensors include (but are not limited to) visible light cameras, infrared cameras, two-dimensional (2D) cameras, three-dimensional (3D) cameras, radar-capable sensors, sensors that detect other wavelengths, and/or any combination thereof.

With exemplary sensors 102 identified and briefly described above, and as will be further discussed below, it is to be generally understood sensors 102 preferably record certain data parameters relating to products and services provided or potentially provided by an insurance carrier, such as USAA, to perform insured property maintenance analytics and claim initiation as described below. It is to be understood and appreciated the aforementioned sensors 102 may be configured as wired and wireless types integrated in a networked environment (e.g., WAN, LAN, WiFi, 802.11X, 3G, LTE, etc.), which may also have an associated IP address. It is to be further appreciated the sensors 102 may consist of internal sensors located within the structure of insured property 300; external sensors located external of the structure of insured property 300; sound sensors for detecting ambient noise (e.g., for detecting termite and rodent activity, glass breakage, intruders, etc.). It is additionally to be understood and appreciated that sensors 102 can be networked into a central computer hub (e.g., device 103) in an insured property to aggregate collected sensor data packets. Aggregated data packets can be analyzed in either an insured property computer system (e.g., device 103) or via an external computer environment (e.g., server 106). Additionally, it is to be understood data packets collected from sensors 102 can be aggregated in insured property computing device 103 and sent as an aggregated packet to server 106 for subsequent analysis whereby data packets may be transmitted at prescribed time intervals (e.g., a benefit is to reduce cellular charges in that some insured properties 300 may not have Internet access or cellular service is backup when insured property Internet service is nonfunctioning).

In accordance with an illustrated embodiment, in addition to the aforementioned, the sensors 102 being utilized relative to insured property 300, insured property computing device 103 may additionally be coupled to a Clock 320 which may keep track of time for device 103, thereby allowing a given item of data to be associated with the time at which the data was captured. For example, device 103 may recurrently detect various environmental conditions relating to insured property 300, recurrently capture images of various portions of the structure of insured property 300, etc., and may timestamp each reading and each image. The time at which the readings are taken may be used to reconstruct events or for other analytic purposes, such as those described below. For example, the environmental sensor may measure the presence of mold/bacteria/algae/lead paint or any contaminant adverse to human health. The timestamps on air quality readings taken after a recent water incident may help determine how long does it take for mold to grow after water damage occurs.

A storage component 322 may further be provided and utilized to store data readings and/or timestamps in device 103. For example, storage component 322 may comprise, or may otherwise make use of, magnetic or optical disks, volatile random-access memory, non-volatile random-access memory or any other type of storage device. There may be sufficient data storage capacity to store several days or several weeks worth of readings. For example, there might be various plumbing issues which can affect the water pressure in a plumbing system to be low. Storage component 322 might have sufficient storage capacity to allow, for example five days of readings to be stored, thereby allowing narrowing down the cause of low water pressure.

A communication component 324 may further be provided and utilized to communicate recorded information from insured property computing device 103 to an external location, such as computer server 106, preferably via communication network 100 (FIG. 1) which may be associated with an insurance carrier such as USAA. Communication component 324 may be, or may comprise, a network communication card such as an Ethernet card, a WiFi card, or any other communication mechanism. However, communication component 324 could take any form and is not limited to these examples. Communication component 324 might encrypt data that it communicates, in order to protect the security and/or privacy of the data. Communication component 324 may communicate data recorded by device 103 (e.g., data stored in storage component 322) to an external location, such as server 106. For example, server 106 may be operated by an insurance company, and may collect data from insured property computing device 103 to learn about risks, repair needs and other analytics relative to maintenance of insured property 300 in which device 103 is located. Communication component 324 may initiate communication sessions with server 106. Or, as another example, server 106 may contact device 103, through communication component 324, in order to receive data that has been stored by device 103. Additionally, data from sensors 102, clock 320 and/or storage component 322 may be communicated directly to server 106, via network 100, thus obviating or mitigating the need for insured property computing device 103.

In the example of FIG. 3, communication component 324 (which is shown, in FIG. 3, as being part of, or used by, insured property computing device 103) communicates data to server 106. Server 106 may comprise, or otherwise may cooperate with, a data analysis module 304, which may analyze data in some manner. Data analysis module 304 may comprise various types of sub-modules, such as insured property analyzer 306 and maintenance manager 308. In general, insured property analyzer 306 may perform an analysis of collected data regarding various attributes of insured property 300, such as, for example, but not limited to, one or more utility systems associated with the insured property 300, utility resource consumption costs associated with the insured property 300 and maintenance costs associated with the insured property 300. For instance, and with regards to utility resource consumption, dwelling analyzer 306 is preferably configured and operational to: determine energy consumption (e.g., appliance devices, lighting systems, entertainment systems, recreational equipment and the like) by one or more devices associated with the insured property (via one or more electrical sensors 102); determine water consumption by one or more devices associated with the insured property (via one or more water pressure sensors 102); determine heating fuel (e.g., gas, oil) consumption by one or more devices associated with the insured property (via one or more fuel sensors 102); determine thermostat settings for one or more HVAC systems during various times of the day and in various climatic conditions (via temperature and thermostat sensor 102 devices); determine when windows are in an open or shut position (via one or more window sensors 102) and determine costs associated with maintenance for the insured property 300 (e.g., changing filters; repairing/replacing appliances and HVAC devices, and the like); and determine ambient weather conditions for the insured property 300 (via one or more environmental sensors 102). It is to be appreciated the above are intended to be exemplary determinations regarding utility resource consumption costs and maintenance costs associated with the insured property 300 and are not to be understood to be limited thereto.

It is to be understood and appreciated dwelling analyzer 306 is configured and operational (preferably via software) to determine financial costs for operating insured property 300 for a determined period of time (e.g., hour, day, week, month year, etc.) based on informatic data received from one or more informatic sensors 102 associated with the insured property 300.

Once the financial costs are determined for operating the insured property 300, dwelling analyzer 306 is further configured and operational to determine cost savings opportunities for the insured property 300 relative to the aforesaid determined financial operating costs for the insured property 300 preferably utilizing predefined business rules. For instance, utilizing predefined business rules, dwelling analyzer 306 may determine better electrical energy consumption may be achieved by adjusting how and when certain appliances are to be used, how lighting systems are to be used; adjust water consumption rates (e.g., refrain from taking multiple baths in one day or watering lawn each day). The dwelling analyzer 306 may also compare the data received from the subject insured property 300 with another similarly situated property (e.g., same general location, size and type) to identify saving opportunities. For instance, dwelling analyzer 306 may determine a similar type of house relative to property 300 achieves the same interior climatic conditions while using less energy by reducing the thermostat to a certain setting and keeping the windows in an open position during certain hours of the day during certain climatic conditions.

In another example, dwelling analyzer 306 may determine the filters for various appliances in the insured property 300 are not being changed often enough causing inefficient appliance operation, or the filters for various appliances in the insured property 300 are being changed too often resulting in unnecessary filter expense.

Data analysis module 304 may be further configured and operational to retrieve and analyze an insurance policy associated with the dwelling 300 to determine if alterations should be made to the insurance policy based upon operation of the insured property 300 in view of the determined operational aspects of the property 300 as described above regarding analysis of the informatic data received from one or more sensor devices 102. Such alterations to an insurance policy for an insured property 300 may include (but are not limited to), changing a premium amount, changing a deductible amount, changing liability limits, changing policy term and the like. For instance, data analysis module 304 may determine operation of the insured property 300 has been altered in reconciliation with one or more identified savings opportunities and hence may make favorable adjustments to the insurance policy for the insured property 300 (e.g., reduce a deductible value).

In yet another example, data analyzer 306 is further configured and operational to divert monetary funds (via through preferably known methods, e.g., Automated Clearing House (ACH) processes) into a designated savings account associated with the user of the insured property 300, which funds are attributable to the aforesaid determination that operation of the insured property 300 has been altered in reconciliation with one or more identified savings opportunities. That is, data analyzer 306 is configured and operational to calculate a realized cost savings attributable to the one or more determined operational changes being made to the insured property (e.g., a $200 savings is attributable to reduced operation of an A/C unit for a thirty (30) day period). Once the aforesaid cost savings is determined, monetary funds are preferable transferred from a first financial account (e.g., a user's checking account) to a designated second account (e.g., a savings account) attributable to the user that is dependent upon the aforesaid calculated cost savings (e.g., $200). For instance, a percentage of the calculated cost savings may be transferred (e.g., 30% ($60)) or the full amount may be transferred (e.g., $200). It is to be appreciated, the first and second financial accounts are not to be limited to being associated with a user of the insured property 300 as they be associated with a third party (e.g., such as a designated party (a friend or family member), a utility company, an insurance company or any other interested third party). It is to be further appreciated that each of the first and second financial accounts may consist of one of the following: a savings account; a checking account; a money market account; a certificate of deposit; a brokerage account; a mutual fund; an individual retirement account; a college savings account; an exchange-traded fund; a current property and casualty premium; a life insurance premium; an auto loan; a credit card; and a debit card.

With regards to the account the funds are transferred to (e.g., the second account), it is to be appreciated such an account may receive beneficial treatment (e.g., a favorable savings interest rate) as a reward for being attributable to a realized cost savings regarding alteration of operation of the insured property 300.

The dwelling analyzer 306 may be further configured and operational to cause funds to be transferred (via through known methods, e.g., ACH) from a third party (e.g., a utility or insurance) to the aforesaid second financial account wherein the funds transferred from the third party (e.g., a utility company) are dependent upon the cost savings realized. Alternatively, the third party (e.g., a utility company) may provide discounts based upon the aforesaid realized cost savings.

In yet another related embodiment, the dwelling analyzer 306 is configured and operational to determine an insurance product reduction amount dependent upon the aforesaid realized cost savings. The reduction amount is preferably a percentage of the realized cost savings (which percentage may exceed 100%). This reduction amount is then preferably applied to the insurance product associated with the insured property subject to the realized cost savings. Such an insurance product includes, but is not limited to: a homeowner's policy, a renter's insurance policy, a rental property insurance policy, an automobile insurance policy, an umbrella insurance policy, a health insurance policy and a life insurance policy. It is to be appreciated application of the reduction amount is at least one of: reducing an insurance policy deductible; reducing an insurance policy premium and/or increasing an insurance policy coverage amount.

Figure 4:
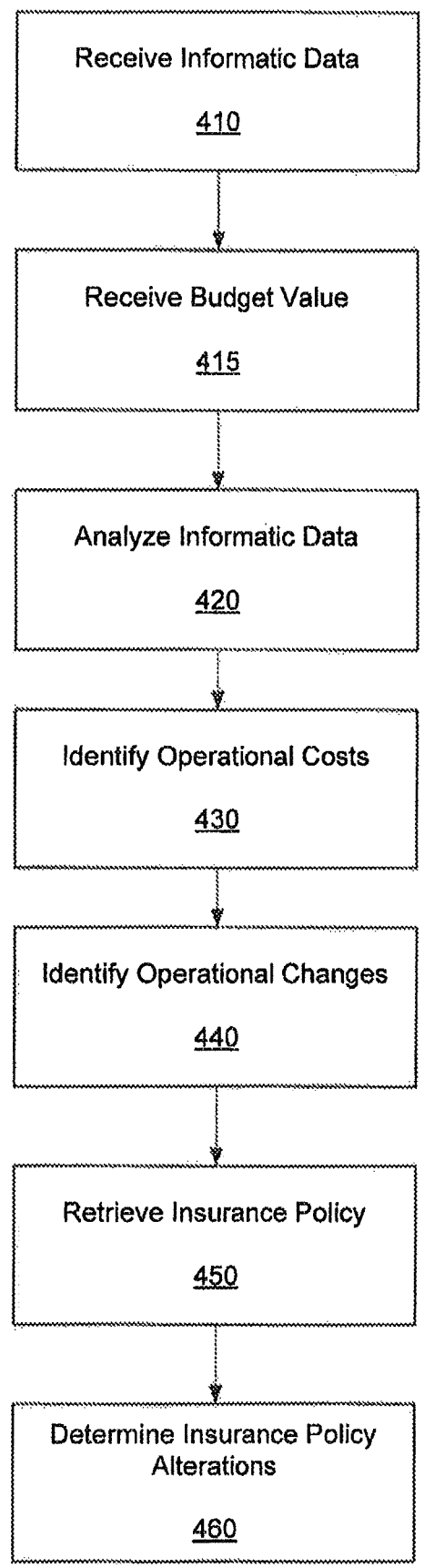
FIG. 4 is a flow diagram of operational steps of the insured property analyzer module of FIG. 3 in accordance with an illustrated embodiment.

With reference now to FIG. 4, shown in the form of a flow chart are exemplary operational steps of the insured property data analysis module 304 for identifying cost savings opportunities for an insured property 300. Before turning to the description of FIG. 4, it is noted that the flow diagrams shown therein are described, by way of example, with reference to components shown in FIGS. 1-3, although these operational steps may be carried out in any system and are not limited to the scenario shown in the aforementioned figures. Additionally, the flow diagram depicted in FIG. 4 shows examples in which operational steps are carried out in a particular order, as indicated by the lines connecting the blocks, but the various steps shown in these diagrams can be performed in any order, or in any combination or sub-combination.

With reference to FIG. 4, at 410, insured property analyzer 306 preferably collects data from sensors 102. In an embodiment of the present invention, this step may involve computing device 103 periodically contacting (via network 100), at prescribed time intervals, data analyzer component 304 running on server 106 to send accumulated data. In an alternative embodiment, contact between the insured property computing device 103 and insured property analyzer 306 may be initiated when the insured property analyzer 306 contacts the insured property computing device 103. Following the initial contact, insured property analyzer 306 may receive data from the insured property computing device 103. It is to be understood data packets collected from sensors 102 can be aggregated in insured property computing device 103 and sent as an aggregated packet to insured property analyzer 306 for subsequent analysis.

At 420, insured property analyzer 306 preferably processes the received data to identify and parse out data relating to one or more operational aspects of the insured property 300 for use in a subsequent cost savings analysis. For example, insured property analyzer 306 may include a parser configured to parse the data relating to energy consumption and/or maintenance requirement costs, as described above. This step may further involve identifying a policy associated with insured property 300 from which the received data is collected.

At 430, insured property data analysis module 304 preferably applies predefined business rules to the aforesaid parsed savings opportunities informatic data to identify savings opportunities regarding one or more operational aspects for the insured property 300, as described above. Once these one or more savings opportunities are determined and identified, notice is provided to a designated custodian of the insured property 300 (e.g., an owner, management service and the like), step 440. It is expected that upon receipt of the identified savings opportunities for the insured property 300, the custodian will thereafter execute one or more of the identified savings opportunities.

As mentioned above, the data analysis module 304 may further identify and retrieve an insurance policy associated with insured property 300 from which the received data is collected, step 450. According to predefined business rules, a determination may then be made by the data analysis module 304 of the insurance server 106 as to whether one or more alterations are to made to the insurance policy contingent upon execution of the one or more identified savings opportunities, as mentioned above, step 460.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A tangible, non-transitory, computer-readable medium, comprising computer-readable instructions that, when executed by one or more processors of a computer, cause the computer to:
   receive a first indication of a property associated with a savings analysis provision policy;
   electronically contact the property associated with the savings analysis provision policy based upon the first indication;
   based on the electronic contact, receive, at an analysis server, a first set of sensor data accumulated over a first time period at the property associated with the savings analysis provision policy, wherein the first set of sensor data relates to at least one operating characteristic of the property associated with the savings analysis provision policy;
   receive a second indication of a second property, wherein the second property is similar to the property associated with the savings analysis provision policy;
   electronically contact the second property based upon the second indication;
   based on the electronic contact, receive, at the analysis server, a second set of sensor data accumulated over the first time period at the second property, wherein the second set of sensor data relates to at least one operating characteristic of the second property;
   parse the first set of sensor data and the second set of sensor data to identify differences in operating characteristics associated with operating the property associated with the savings analysis provision policy and the second property;
   based on the identified differences, identify operational changes to be implemented at the property associated with the savings analysis provision policy;
   send the identified operational changes to a designated custodian of the property associated with the savings analysis provision policy;
   in response to sending the identified operational changes to the designated custodian of the property associated with the savings analysis provision policy, transmit an instruction to at least one sensor device, wherein the instruction comprises an instruction to take a series of readings, over a second time period, relating to the at least one operating characteristic of the property associated with savings analysis provision policy;
   receive a third set of sensor data accumulated over the second time period by the at least one sensor device at the property associated with the savings analysis provision policy;
   determine that at least one of the identified operational changes has been implemented based on the third set of sensor data; and
   provide a notification indicating a provision of a discount, a rebate, a monetary transfer, or any combination thereof.

2. The computer-readable medium of claim 1, wherein identifying the operational changes to be recommended includes achieving a target cost savings established by a user of the second property.

3. The computer-readable medium of claim 1, comprising computer-readable instructions that, when executed by the one or more processors of the computer, cause the computer to perform the monetary transfer, wherein the monetary transfer is a transfer of funds from a first financial account to a second financial account.

4. The computer-readable medium of claim 3, wherein the first financial account and the second financial account are associated with a user of the second property.

5. The computer-readable medium of claim 4, wherein the funds transferred to the second financial account receive beneficial treatment as a reward for being attributable to implementation of the operational changes at the property associated with the savings analysis provision policy.

6. The computer-readable medium of claim 3, wherein the first financial account is selected from the group consisting of: a savings account; a checking account a money market account; a certificate of deposit; a brokerage account; a mutual fund; an individual retirement account; a college savings account; an exchange-traded fund; a current property and casualty premium; a life insurance premium; an auto loan; a credit card; and a debit card.

7. The computer-readable medium of claim 3, comprising computer-readable instructions that, when executed by the one or more processors, cause the computer to:
cause funds to be transferred from a third party to the second financial account, wherein an amount of the funds is determined based on an amount of the funds transferred from the first financial account to the second financial account.

8. The computer-readable medium of claim 1, comprising computer-readable instructions that, when executed by the one or more processors, cause the computer to:
trigger the provision of the discount, by:
determining an insurance product change amount based upon the identified operational changes; and
applying the change amount to the savings analysis provision policy associated with the property associated with the savings analysis provision policy.

9. The computer-readable medium of claim 8, wherein the savings analysis provision policy is one of a homeowner's policy, a renter's insurance policy, a rental property insurance policy, an automobile insurance policy, an umbrella insurance policy, a health insurance policy, and a life insurance policy.

10. The computer-readable medium of claim 8, wherein application of the change amount is at least one of: reducing an insurance policy deductible, reducing an insurance policy premium, and increasing an insurance policy coverage amount.

11. The computer-readable medium of claim 1, comprising computer-readable instructions that, when executed by the one or more processors, cause the computer to adjust at least one operating characteristic of the property associated with the savings analysis provision policy to implement the identified operational changes.

12. The computer-readable medium of claim 11, comprising computer-readable instructions that, when executed by the one or more processors, cause the computer to: adjust the at least one operating characteristic, by adjusting performance of at least one appliance device associated with the property associated with the savings analysis provision policy.

13. The computer-readable medium of claim 1, wherein the at least one operating characteristic of the second property comprises energy consumption by one or more energy consumption devices associated with the second property.

14. A computer-implemented method, comprising:
receiving a first indication of a property associated with a savings analysis provision policy;
electronically contacting the property associated with the savings analysis provision policy based upon the first indication;
based on the electronic contact, receiving, at an analysis server, a first set of sensor data accumulated over a first time period at the property associated with the savings analysis provision policy, wherein the first set of sensor data relates to at least one operating characteristic of the property associated with the savings analysis provision policy;
receiving a second indication of a second property wherein the second property is similar to the property associated with the savings analysis provision policy;
electronically contacting the second property based upon the second indication;
based on the electronic contact, receiving, at the analysis server, a second set of sensor data accumulated over the first time period at the second property, wherein the second set of sensor data relates to at least one operating characteristic of the second property;
parsing the first set of sensor data and the second set of sensor data to identify differences in operating characteristics associated with operating the property associated with the savings analysis provision policy and the second property;
based on the identified differences, identifying operational changes to be implemented at the property associated with the savings analysis provision policy;
sending the identified operational changes to a designated custodian of the property associated with the savings analysis provision policy;
in response to sending the identified operational changes to the designated custodian of the property associated with the savings analysis provision policy, transmit an instruction to at least one sensor device, wherein the instruction comprises an instruction to take a series of readings, over a second time period, relating to the at least one operating characteristic of the property associated with savings analysis provision policy;
receiving a third set of sensor data accumulated over the second time period by the at least one sensor device at the property associated with the savings analysis provision policy;
determining that at least one of the identified operational changes has been implemented based on the third set of sensor data; and
provide a notification indicating a provision of a discount, a rebate, a monetary transfer, or any combination thereof.

15. The computer-implemented method of claim 14, wherein identifying the operational changes to be recommended includes achieving a target cost savings established by a user of the second property.

16. The computer-implemented method of claim 14, comprising:
performing the monetary transfer, wherein the monetary transfer is a transfer of funds from a first financial account associated with a user to a second financial account associated with the user or from a third-party financial account to the second financial account associated with the user, wherein the second financial account is selected from the group consisting of: a savings account; a checking account a money market account; a certificate of deposit; a brokerage account; a mutual fund; an individual retirement account; a college savings account; an exchange-traded fund; a current property and casualty premium; a life insurance premium; an auto loan; a credit card; and a debit card.

17. The computer-implemented method of claim 14, comprising:
triggering the provision of the discount, by:
determining a savings analysis provision policy change amount based upon the identified operational changes, wherein the savings analysis provision policy is one of a homeowner's policy, a renter's insurance policy, a rental property insurance policy, an automobile insurance policy, an umbrella insurance policy, a health insurance policy, and a life insurance policy; and
applying the change amount to an insurance product associated with the second property.

18. The computer-implemented method of claim 14, comprising: adjusting at least one operating characteristic of the property associated with the savings analysis provision policy, by adjusting performance of at least one appliance device associated with the property associated with the savings analysis provision policy.

19. A computer, comprising:
memory;
at least one processor, configured to:
receive a first indication of a property associated with a savings analysis provision policy;
electronically contact the property associated with the savings analysis provision policy based upon the first indication;
based on the electronic contact, receive, at an analysis server, a first set of sensor data accumulated over a first time period at the property associated with the savings analysis provision policy, wherein the first set of sensor data relates to at least one operating characteristic of the property associated with the savings analysis provision policy;
receive a second indication of a second property wherein the second property is similar to the property associated with the savings analysis provision policy;
electronically contact the second property based upon the second indication;
based on the electronic contact, receive, at the analysis server, a second set of sensor data accumulated over the first time period at the second property, wherein the second set of sensor data relates to at least one operating characteristic of the second property;
parse the first set of sensor data and the second set of sensor data to identify differences in operating characteristics associated with operating the property associated with the savings analysis provision policy and the second property;
based on the identified differences, identify operational changes to be implemented at the property associated with the savings analysis provision policy;
send the identified operational changes to a designated custodian of the property associated with the savings analysis provision policy;
in response to sending the identified operational changes to the designated custodian of the property associated with the savings analysis provision policy, transmit an instruction to at least one sensor device, wherein the instruction comprises an instruction to take a series of readings, over a second time period, relating to the at least one operating characteristic of the property associated with savings analysis provision policy;
receive a third set of sensor data accumulated over the second time period by the at least one sensor device at the property associated with the savings analysis provision policy;
determine that at least one of the identified operational changes has been implemented based on the third set of sensor data; and
provide a notification indicating a provision of a discount, a rebate, a monetary transfer, or any combination thereof.

20. The computer of claim 19, wherein the at least one processor is configured to:
adjust at least one operating characteristic of the property associated with the savings analysis provision policy, by adjusting performance of at least one appliance device associated with the property associated with the savings analysis provision policy.

* * * * *